Nov. 16, 1965  D. H. PRUTTON  3,217,342
MACHINE FOR CUTTING A WORKPIECE DURING
PLANETARY ROTATION THEREOF
Filed April 16, 1963  3 Sheets-Sheet 1

INVENTOR.
DANIEL H. PRUTTON
BY
ATTORNEY

Nov. 16, 1965                    D. H. PRUTTON                    3,217,342
              MACHINE FOR CUTTING A WORKPIECE DURING
                      PLANETARY ROTATION THEREOF
Filed April 16, 1963                                    3 Sheets-Sheet 3

INVENTOR.
DANIEL H. PRUTTON
BY
ATTORNEY

United States Patent Office 3,217,342
Patented Nov. 16, 1965

3,217,342
MACHINE FOR CUTTING A WORKPIECE DURING PLANETARY ROTATION THEREOF
Daniel H. Prutton, Cleveland, Ohio
(Rte. 1, Box 333, Englewood, Fla.)
Filed Apr. 16, 1963, Ser. No. 273,505
6 Claims. (Cl. 10—9)

The invention relates in general to a cutting machine for a rotary workpiece and, more particularly, to a planetary type machine to drive a workpiece and to cut or form a surface on the workpiece during planetary rotation.

The invention may be embodied in a planetary type mechanism using a rotary die and a second die to drive a workpiece blank therebetween with the rotary die being journaled on an axis. The die means have an entrance and an exit and a cutter means is mounted adjacent to the rotary die. The cutter means has an effective cutting portion progressively extending into the space between the die means as the area of the exit is approached, and means is provided to rotate the rotary die to provide planetary travel of a workpiece blank from the entrance to the exit and to cut away an area on said blank by said cutter means.

An object of the invention is to provide planetary drive of a workpiece while operating thereon with a cutter or forming means.

Another object of the invention is to provide rotary cutter means to cut away a portion or to point a workpiece blank which is rotated by relatively rotary dies.

Another object of the invention is to provide a planetary drive of a workpiece blank about a first axis and to have the blank operated upon by a cutter acting from a second axis parallel to the first.

Another object of the invention is to provide a rotary die on a first axis and a rotary cutter of smaller diameter operating around a second axis displaced from the first so that the cutter progressively extends outwardly beyond the rotary die.

Another object of the invention is to provide a rotary die and a rotary cutter, each rotating around different axes.

Another object of the invention is to provide a high speed blank pointing or cutting machine which may provide a cutting action on a workpiece blank at the same time that a rotary die provides a planetary action on the workpiece.

Figure 1:
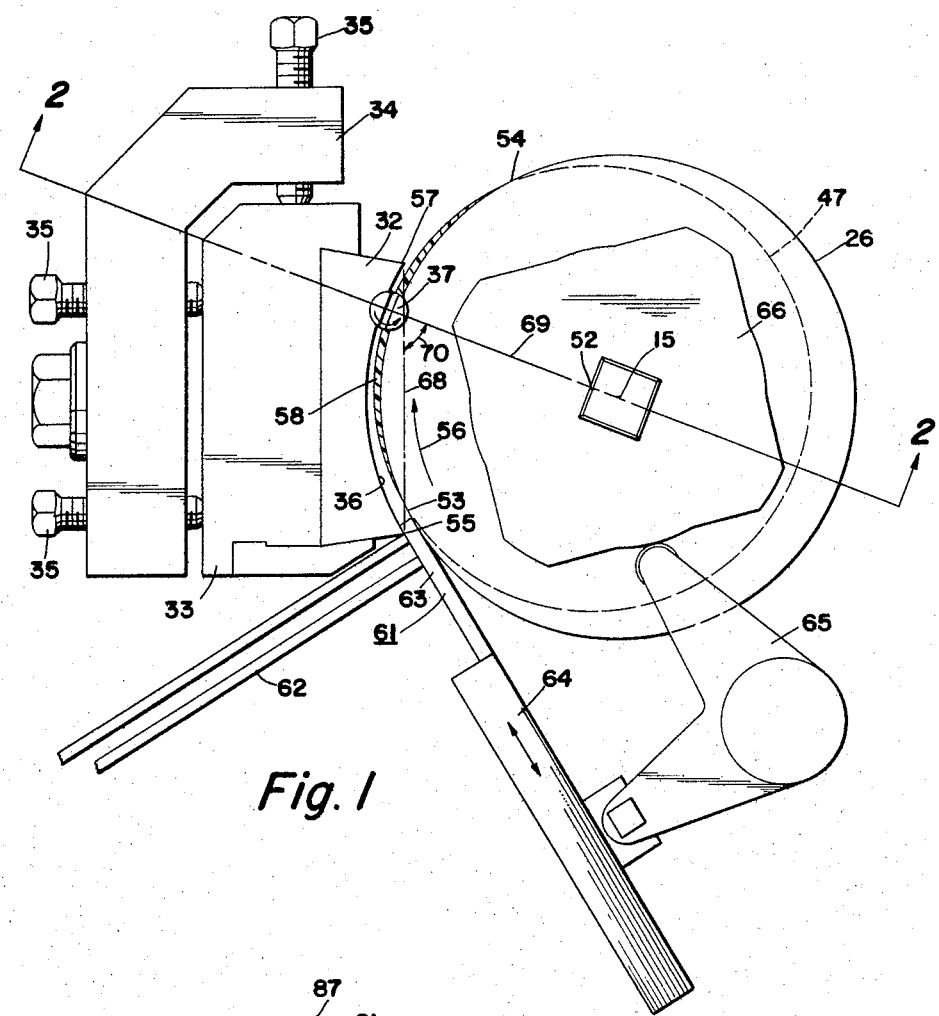
Figures 5, 6:
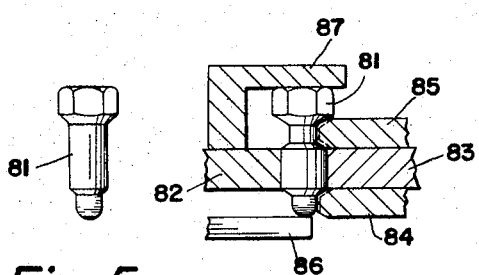
Figure 2:
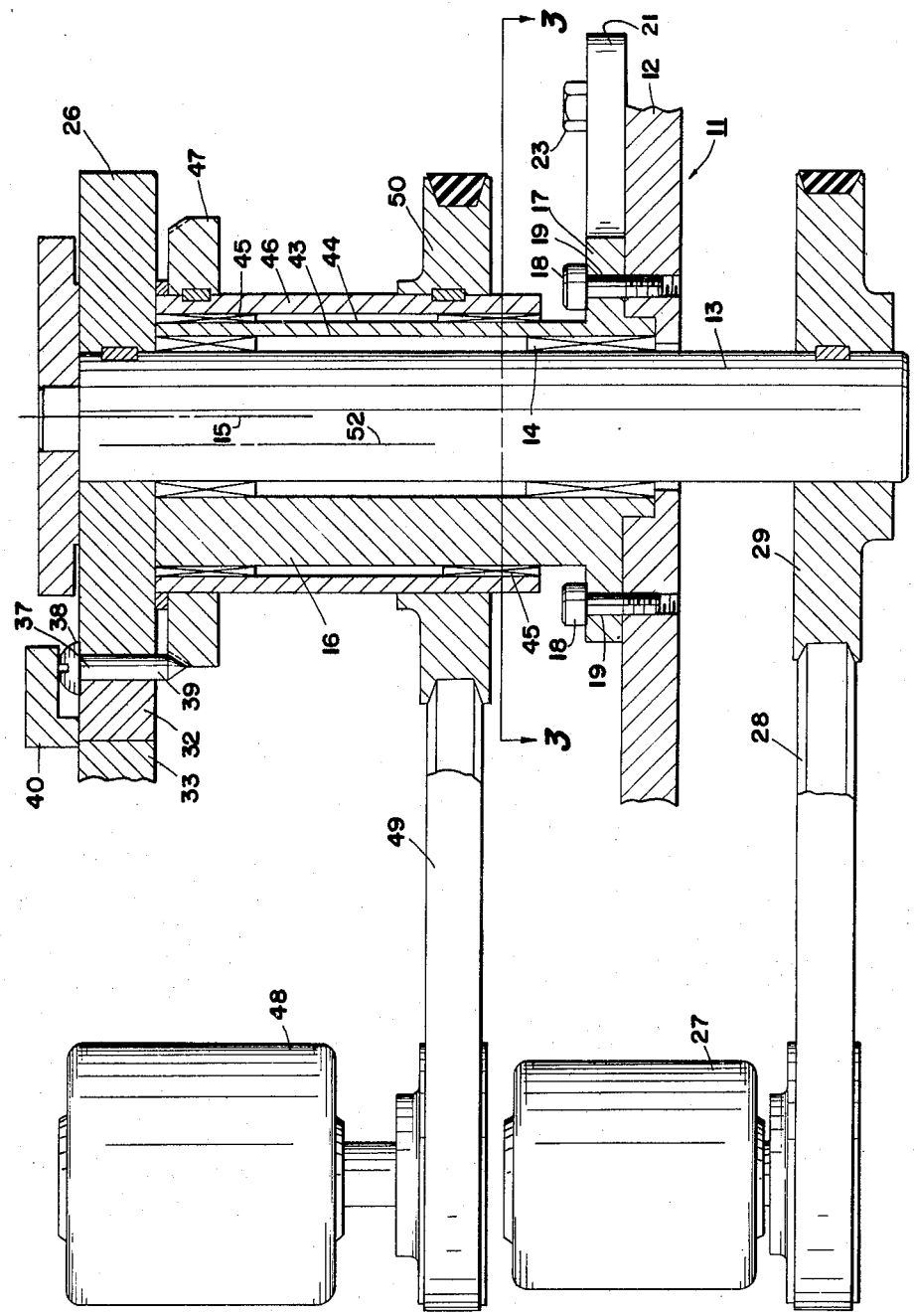
Figure 3:
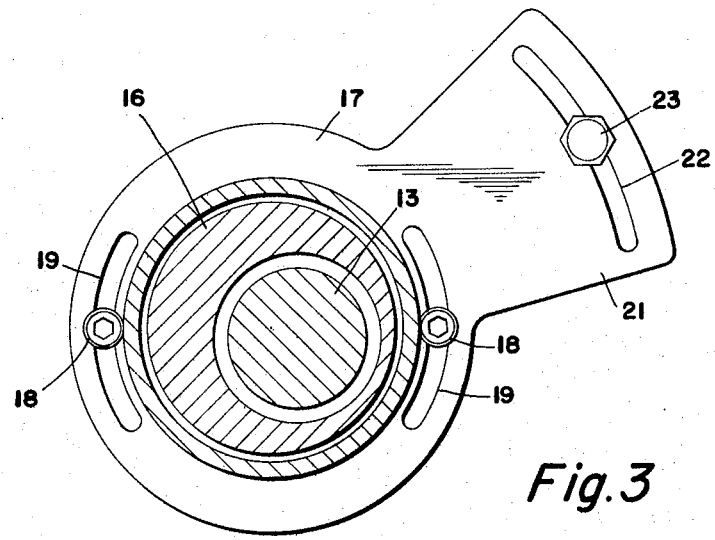
Figure 4:
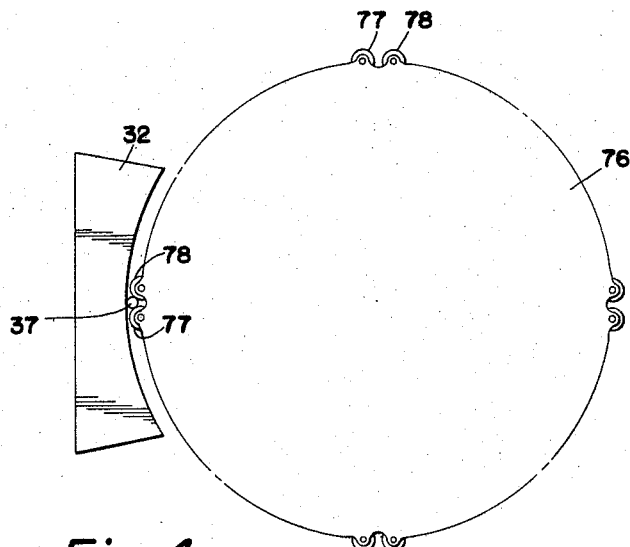

Other objects and a fuller understanding of this invention may be had by referring to the following description and claims, taken in conjunction with the accompanying drawings, in which:

FIGURE 1 is a plan view of a cutting machine embodying the invention;
FIGURE 2 is a sectional view on line 2—2 of FIGURE 1;
FIGURE 3 is a partial sectional view on line 3—3 of FIGURE 2;
FIGURE 4 is a partial plan view of a modification;
FIGURE 5 is a second form of workpiece blank; and
FIGURE 6 is a partial view similar to FIGURE 2 showing operation on the alternative form of workpiece blank.

FIGURES 1, 2 and 3 show a cutting machine 11 which illustrates one form of the invention. This cutting machine has a base 12 which journals a drive spindle 13 on bearings 14. The spindle 13 has a first axis 15 which is shown in the machine 11 as being vertical. The bearings 14 are carried in an eccentric bushing 16 which has a lower flange 17. This flange rests on the base 12 and is fastened thereto by bolts 18 passing through slots 19 in the flange 17. An adjustment arm 21 extends from the flange 17 and also has a slot 22 through which a lock bolt 23 passes into the base 12. The bolts 18 and 23 may be loosened to permit adjustment of the arm 21 and eccentric bushing 16 for adjustment purposes, to be described below.

A rotary die or first die 26 is fixed to the drive spindle 13 to rotate therewith. Suitable drive means is provided for the drive spindle 13 and this is shown as a motor 27 driving through a belt 28 to a lower pulley 29 on the spindle 13. A second or stationary die 32 is carried on the base 12 on an adjustable plate 33. A bracket 34 fixed on the base 12 carries adjusting screws 35 for adjusting the position of the stationary die along two different paths in a plane which in this machine is shown as being horizontal. The stationary die 32 has a working surface 36 which is on an arc from the first axis 15. The outer cylindrical peripheral surface of the rotary die 26 is also a working surface and is on a radius from the axis 15. Together the dies 26 and 32 provide planetary drive of a workpiece blank 37 shown as having a slotted head 38 and a generally cylindrical shank 39. A guide shoe 40, not shown in FIGURE 1 for clarity, may overlie the head 39 to hold the workpiece blank 37 from riding up during planetary drive.

The eccentric bushing 16 has a bore 43 in which the bearings 14 are carried which is eccentric relative to an outer cylindrical surface 44 thereon. This outer surface 44 carries bearings 45 which journal an outer sleeve 46. Cutter means 47 is shown as a rotary cutter fixed on this outer sleeve 46 adjacent to and below the rotary die 26. The outer sleeve 46 is rotated by drive means which may be a motor 48 driving through a belt 49 to a pulley 50 fixed on the sleeve 46. The sleeve 46 has a second axis 52 which is displaced from and parallel to the first axis 15. As shown, both these axes are vertical.

The rotary cutter 47 has a diameter smaller than the diameter of the rotary cutter 26. The rotary cutter 47 and the rotary die 26 are tangent at two locations, namely, at first and second vertical lines 53 and 54. The first vertical line is adjacent an entrance 55 of the dies which is at one end of the stationary die 32, considering the rotation of the die 26 to be clockwise as indicated by the arrow 56. The second vertical line 54 is beyond the exit 57 of the dies. This construction permits the rotary cutter 47 to have an arcuate peripheral portion 58 which is an effective cutting portion. This effective cutting portion progressively extends radially outwardly beyond the rotary die 26 between the first tangent line 53 and the area of the exit 57. The amount of this radial extension is that the cutter extends to a point substantially midway between the rotary die 26 and the stationary die 32 at the exit 57. This is at the area whereat the workpiece blank 37 is shown in FIGURE 1.

A suitable feed mechanism 61 is provided including a feed trough 62 down which workpiece blanks may slide toward a pusher 63. This pusher reciprocates by a reciprocating slide 64 actuated through a bell crank lever 65 from a feed cam 66 rotating with the rotary die 26.

The stationary die 32 may be considered as subtending a chord 68. A line 69 in the horizontal plane and intersecting the axes 15 and 52 will establish an acute angle 70 with this chord 68.

The bolts 18 and 23 may be loosened and the arm 21 arcuately moved to adjust the arcuate position of the second axis 52 relative to the first axis 15. This shifts the first line 53 of tangency relative to the stationary die 32 and also varies the amount of radially outward extension at the exit 57. The first line of tangency 53 should be subsequent to the entrance 55 so that the workpiece is effectively gripped by the dies 26 and 32 in its planetary travel before cutting begins on this workpiece 37. The rotary cutter 47 is shown as cutting a point on the lower end of this workpiece blank 37. Preferably, the rotary cutter 27 rotates in a direction opposite to that of the rotary die 26 for more effective cutting action.

The machine 11 may operate by having the rotary die rotate in a clockwise direction as viewed in FIGURE 1 and the rotary cutter 47 rotating counterclockwise. The feed mechanism 61 periodically supplies a workpiece blank 37 to the entrance 55 of the dies 26 and 32. Rotation of this die 26 provides planetary drive of the workpiece 37 between the two dies and the planetary rotation is in a counterclockwise direction. Accordingly, with the rotary cutter 47 operating counterclockwise this gives a fast cutting action on the workpiece 37. Since the effective cutting portion 58 of the rotary cutter 47 progressively extends into the space between the two dies 26 and 32 as the workpiece approaches exit 57, the lower end of the workpiece 37 is progressively shaved or cut to provide the completely pointed end on the workpiece 37 by the time the workpiece arrives at the exit 57. The feed cam 66 has been shown as being a four lobe cam but any number may be used with higher numbers giving faster progressive feed of successive workpieces.

The rotary die 47 operates on an effective radius from the axis 52 which is parallel to but displaced from the first axis 15. Because this axis is closer to the stationary die 32 than the first axis 15, and because the cutter 47 has a smaller diameter than the die 26, this provides the outwardly extending effective cutter portion 58. The fact that the line 69 joining the axes 15 and 52 intersects the chord 68 at an acute angle 70 is a means if assuring that the cutter 47 progressively extends into the space between the dies 26 and 32 to cut the workpiece 37.

The working surfaces of the dies 26 and 32 may be smooth or may be roughened for better drive of the workpiece 37. Also, they may be knurled to provide a knurled surface on the workpiece 37 at the same time that the cutter 47 is operating on the workpiece. By this means dual operations may be performed on the workpiece 37.

FIGURE 4 is a partial plan view of a modified rotary die 76 which may be substituted for the rotary die 26 in FIGURES 1 to 3. This rotary die 76 has plural stations shown as being four in number. Each station is identical and journals first and second rollers 77 and 78 spaced sufficiently closely to provide, with the stationary die 32, a three line support of a workpiece 37. This provides planetary drive to the workpiece 37 and the three point or three line support provides superior attitude control of the workpiece to maintain it vertical.

FIGURE 5 shows a modified form of workpiece blank 81. FIGURE 6 is a partial sectional view similar to FIGURE 2 showing operation on this workpiece blank 81. The FIGURE 6 shows a stationary die 82 and a rotary die 83 for planetary drive of the workpiece 81. A lower rotary cutter 84 and an upper rotary cutter 85 are provided. A lower guide shoe 86 and an upper guide shoe 87 are provided to axially retain the workpiece 81. The rotary cutters 84 and 85 provide cutting action on the workpiece 81 and may be rotated by an suitable means such as the drive means 48 shown in FIGURE 2. The upper rotary cutter cuts a peripheral grove in the workpiece 81 and the lower cutter 84 cuts a shoulder and establishes a smaller diameter on the workpiece near the lower end. This FIGURE 6 illustrates how the cutting machine of the invention may be used to provide cutting action other than pointing and shaving.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A screw pointing machine comprising, in combination a frame,
   rotary driving die means journaled on said frame on a first vertical axis,
   an arcuate stationary die mounted on said frame and positioned substantially on a radius from said first vertical axis,
   said die and die means having an entrance and an exit and cooperating to provide rotating planetary drive of a screw workpiece blank from said entrance to said exit,
   rotary pointing cutter means journaled on said frame adjacent said rotary die means on a second vertical axis, the arc of said stationary die subtending a chord,
   a line extending from said first axis to said second axis in a horizontal plane converging toward the lie of said chord at an acuate angle,
   said rotary cutter means having a smaller diameter than said rotary die means,
   said rotary die means and cutter means being tangent along a vertical line substantially at said entrance of said dies,
   said rotary cutter means having an arcuate peripheral portion progressively extending radially outwardly beyond said rotary die means between said tangent line and the area of said exit to a point substantially midway between said stationary die and rotary die means at said exit,
   and means to rotate said rotary cutter means to point an end of any said workpiece blank during planetary travel from said entrance to said exit.

2. A screw pointing machine comprising, in combination, a frame,
   a rotary cylindrical driving die journaled on said frame on a first vertical axis,
   an arcuate stationary die mounted on said frame and positioned substantially on a radius from said first vertical axis,
   said dies having an entrance and an exit and cooperating to provide rotating planetary drive of a screw workpiece blank from said entrance to said exit,
   a rotary pointing cutter journaled on said frame below said rotary die on a second vertical axis,
   said rotary cutter having a smaller diameter than said rotary die,
   said rotary die and cutter being tangent along a vertical line substantially at said entrance of said dies,
   said rotary cutter having an arcuate peripheral portion progressively extending radially outwardly beyond said rotary die between said tangent line and the area of said exit to a point substantially midway between said stationary and rotary dies at said exit,
   and means to rotate said rotary cutter in a direction opposite to that of said rotary die to point the lower end of any said workpiece blank during planetary travel from said entrance to said exit.

3. A screw pointing machine comprising, in combination, a frame,
   an arcuate stationary die of an arc of about 45° mounted on said frame in a horizontal plane,
   a rotary cylindrical driving die journaled on said frame on a first vertical axis,
   adjustment means to adjust the relative position of said stationary die and driving die through a limited range in two directions in a substantially horizontal plane on said frame with the arc of said stationary die being positioned substantially on a radius from said first vertical axis,
   said dies having an entrance and an exit and cooperating to provide rotating planetary drive of a screw workpiece blank from said entrance to said exit,
   a rotary pointing cutter journaled on said frame below said rotary die on a second vertical axis, said rotary cutter having a smaller diameter than said rotary die, said rotary die and cutter being tangent along a vertical line substantially at said entrance of said dies, said rotary cutter having an arcuate peripheral portion progressively extending radially outwardly beyond said rotary die between said tangent line and the area of said exit to a point substantially midway between said stationary and rotary dies at said exit, means to rotatively adjust the arcuate position of said second vertical axis relative to said first vertical axis to shift the said line of tangency relative to said stationary die entrance and to vary the amount of radially outward extension at said stationary die exit, and means to rotate said rotary cutter in a direction opposite to that of said rotary die to point the lower end of any said workpiece blank during planetary travel from said entrance to said exit.

4. A screw pointing machine comprising, in combination, a frame, an arcuate stationary die of an arc of about 45° mounted on said frame in a horizontal plane, a rotary cylindrical driving die journaled on said frame on a first vertical axis, adjustment means to adjust the position of said stationary die through a limited range in two directions in said horizontal plane on said frame with the arc of said stationary die being positioned substantially on a radius from said first vertical axis, said dies having an entrance and an exit and cooperating to provide rotating planetary drive of a screw workpiece blank from said entrance to said exit, a rotary pointing cutter journaled on said frame below said rotary die on a second vertical axis, the arc of said stationary die subtending a chord, a line extending from said first axis to said second axis in a horizontal plane converging toward the line of said chord at an acute angle, said rotary cutter having a smaller diameter than said rotary die, said rotary die and cutter being tangent along first and second vertical lines substantially at said entrance of said dies and beyond the exit of said dies, respectively, said rotary cutter having an arcuate peripheral cutting portion progressively extending radially outwardly beyond said rotary die between said first tangent line and the area of said exit to a point substantially midway between said stationary and rotary dies at said exit, means to rotatively adjust the arcuate position of said second vertical axis relative to said first vertical axis to shift the said first line of tangency relative to said stationary die entrance and to vary the amount of radially outward extension at said stationary die exit, and means to rotate said rotary cutter in a direction opposite to that of said rotary die to point the lower end of any said workpiece blank during planetary travel from said entrance to said exit.

5. A forming machine comprising, in combination, a frame, rotary driving die means journaled on said frame on a first axis, second die means mounted on said frame and positioned substantially on a radius from said axis, said die means having an entrance and an exit and cooperating to provide rotating planetary drive of a workpiece blank from said entrance to said exit, rotary forming means on said frame adjacent said rotary die means, and on a second axis substantially parallel to said first axis, said rotary forming means having an effective work operating portion progressively extending into the space between said die means as the area of said exit is approached, said rotary die means and rotary forming means being tangent along first and second lines substantially at the entrance of said die means and beyond the exit of said die means, respectively, means to rotatively adjust the arcuate position of said second axis relative to said first axis to shift said first line of tangency relative to said second die means entrance and to vary the amount of extension of said rotary forming means into said space at said exit, and means to rotate said rotary die means to provide planetary travel of any said workpiece blank from said entrance to said exit and to operate on said blank by said forming means.

6. A forming machine comprising, in combination, a frame, rotary driving die means journaled on said frame on a first axis, second die means mounted on said frame and positioned substantially on a radius from said first axis, said die means having an entrance and an exit and cooperating to provide rotating planetary drive of a workpiece blank from said entrance to said exit, forming means on said frame adjacent said rotary die means and having an effective work operating radius from a second axis substantially parallel to said first axis, a line extending between said entrance and exit of said second die means subtending a chord, a line extending from said first to said second axis and to said chord converging with said chord at an acute angle, said forming means being tangent with one of said die means along a line substantially at said entrance of said die means, said forming means having a peripheral forming portion progressively extending radially into the space between said die means between said tangent line and the area of said exit, and means to rotate said rotary die means to provide planetary travel of any said workpiece blank from said entrance to said exit and to operate on said blank by said forming means.

References Cited by the Examiner
UNITED STATES PATENTS

| | | | |
|---|---|---|---|
| 223,029 | 12/1879 | Burkhardt | 80—56 |
| 223,730 | 1/1880 | Harvey | 10—4 |
| 593,067 | 11/1897 | Gowen | 51—88 |
| 2,475,009 | 7/1949 | Catucci | 51—79 |
| 2,727,255 | 12/1955 | Fray | 10—4 |
| 2,923,186 | 2/1960 | Pierson | 80—18 |
| 3,097,378 | 7/1963 | Meyercordt et al. | 10—21 |

ANDREW R. JUHASZ, *Primary Examiner.*